United States Patent [19]

Maurer et al.

[11] Patent Number: 5,209,202

[45] Date of Patent: May 11, 1993

[54] MULTIPLE FUNCTIONS CAM SENSING

[75] Inventors: James B. Maurer, Farmington Hills; Michael D. Czekala, Canton; Marc G. Mrjoian, Ann Arbor, all of Mich.

[73] Assignee: Ford Motor Company, Dearborn, Mich.

[21] Appl. No.: 919,339

[22] Filed: Jul. 27, 1992

[51] Int. Cl.$^5$ ............................ F01L 1/34; F02P 7/07; F02P 11/00; F02D 41/22

[52] U.S. Cl. .............................. 123/414; 123/90.17; 123/479; 123/643

[58] Field of Search ................ 123/90.17, 90.31, 414, 123/479, 613, 617, 643; 73/116

[56] References Cited

U.S. PATENT DOCUMENTS

| | | | |
|---|---|---|---|
| 4,365,602 | 12/1982 | Stiller et al. | 123/414 |
| 4,459,968 | 7/1984 | Brandt et al. | 123/617 X |
| 4,485,784 | 12/1984 | Fujii et al. | 123/414 X |
| 4,615,318 | 10/1986 | Imoto et al. | 123/414 |
| 4,873,958 | 10/1989 | Abe | 123/424 |
| 4,924,830 | 5/1990 | Abe | 123/414 |
| 4,926,822 | 5/1990 | Abe et al. | 123/414 |
| 4,953,531 | 9/1990 | Abe | 123/414 |
| 5,117,784 | 6/1992 | Schechter et al. | 123/90.17 |
| 5,144,920 | 9/1992 | Imperial | 123/90.31 X |

Primary Examiner—Tony M. Argenbright
Attorney, Agent, or Firm—Roger L. May; Peter Abolins

[57] ABSTRACT

A variable cam phase timing system in which there is one crankshaft sensor, and one camshaft sensor per independently phase shiftable camshaft which can be used for controlling the cam phase shifting, sequential fuel control, and also spark timing during both start-up and during run. In addition, the system can control spark timing, without phase shifting, should the crankshaft sensor fail.

10 Claims, 3 Drawing Sheets

MULTIPLE FUNCTIONS CAM SENSING

TECHNICAL FIELD

This invention relates to systems and methods for determining camshaft and engine rotational location and velocity in order to phase shift camshafts relative to a crankshaft and also control sequential fuel injection and ignition, during both start-up and while running. Also, the system allows for ignition timing should the crankshaft sensor fail.

BACKGROUND ART

Typically, in multiple cylinder internal combustion engines, the timing between the camshaft and the crankshaft are fixed. However, in order to increase fuel economy and reduce harmful emissions emitted from the engine, the timing (or phase) of the camshaft relative to the crankshaft needs to be adjusted to optimize the engine for different operating conditions. As a result, phase shifting mechanisms have been developed to allow the rotational phase of the camshaft to vary relative to the crankshaft. In addition, sensors have been added along with marked camshaft data wheels and a crankshaft data wheel, to determine the rotational position and velocity of the camshaft and crankshaft which then signals to an onboard microprocessor. This then determines how much phase shift is needed for a given engine operating condition and activates the phase shifting mechanisms to accomplish the phase shift.

Another recent advance in engine technology, also for reducing harmful emissions and increasing fuel economy, is sequential fuel injection. In order to accomplish this, an additional sensor and camshaft sensing wheel has been added to read the cylinder identification, which locates the top dead-center position of the first cylinder. With this information electronically transmitted to an onboard computer, the computer can electronically transmit a signal to the individual fuel injectors to optimize the timing of the injection of fuel into each individual cylinder.

With the addition of these and other recent advancements, it has become important to have a crankshaft sensor to determine the ignition timing for each cylinder. In case of a problem with a crankshaft sensor, an additional redundant sensor on the crankshaft has typically been used to back-up the first sensor in case of failure.

In order to reduce the number of sensors, marked camshaft data wheels and computer inputs with a resulting reduction in cost and improved reliability, and still accomplish these functions simultaneously, a system which integrates these functions is needed. Then, one integrated system can accomplish camshaft phase shifting, sequential fuel injection, ignition operation and also ignition operation when the crankshaft sensor fails without the need for a redundant crankshaft sensor.

SUMMARY OF THE INVENTION

The present invention contemplates a system and method for accurately determining the position and velocity of multiple camshafts, and also engine position, using one crankshaft sensor and one camshaft sensor for each independently phase shiftable camshaft, respectively. This integrated system can then control four functions at one time, namely, controlling cam phase shifting, controlling cylinder identification for sequential fuel injection at both start-up and also during running, controlling normal ignition operation and controlling ignition timing should the crankshaft sensor fail.

Variable cam timing (VCT) signals are sent to a first onboard microprocessor along with a signal from the crankshaft sensor, modified by a second onboard microprocessor. These signals are compared to determine both crankshaft rotational position and velocity and also the rotational position and velocity of each camshaft relative to the crankshaft rotational position and velocity. This information is then processed to determine the necessary phase shift of the respective independently phase shiftable camshafts relative to the crankshaft, for given engine operating conditions, and activate the camshaft phase shift actuator in order to maximize fuel economy and reduce emissions. These VCT signals are also accurate enough to provide for sequential fuel injection on start-up as well as the engine running condition, to further reduce harmful emissions.

An additional benefit of accurately determining the camshaft rotational position, is that the engine position can be determined from the camshaft sensors alone, thus providing for continuing vehicle operation, albeit at less than the optimum operating condition. Therefore, should the crankshaft sensor fail, the ignition timing, normally calculated from the crankshaft sensor signal, used in determination of engine position, may also be determined from the VCT signal produced by the camshaft sensors. This removes the need for a redundant crankshaft sensor. A limit to this alternative operating condition is that camshaft phase shifting is prohibited until the crankshaft sensor is again operating properly.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
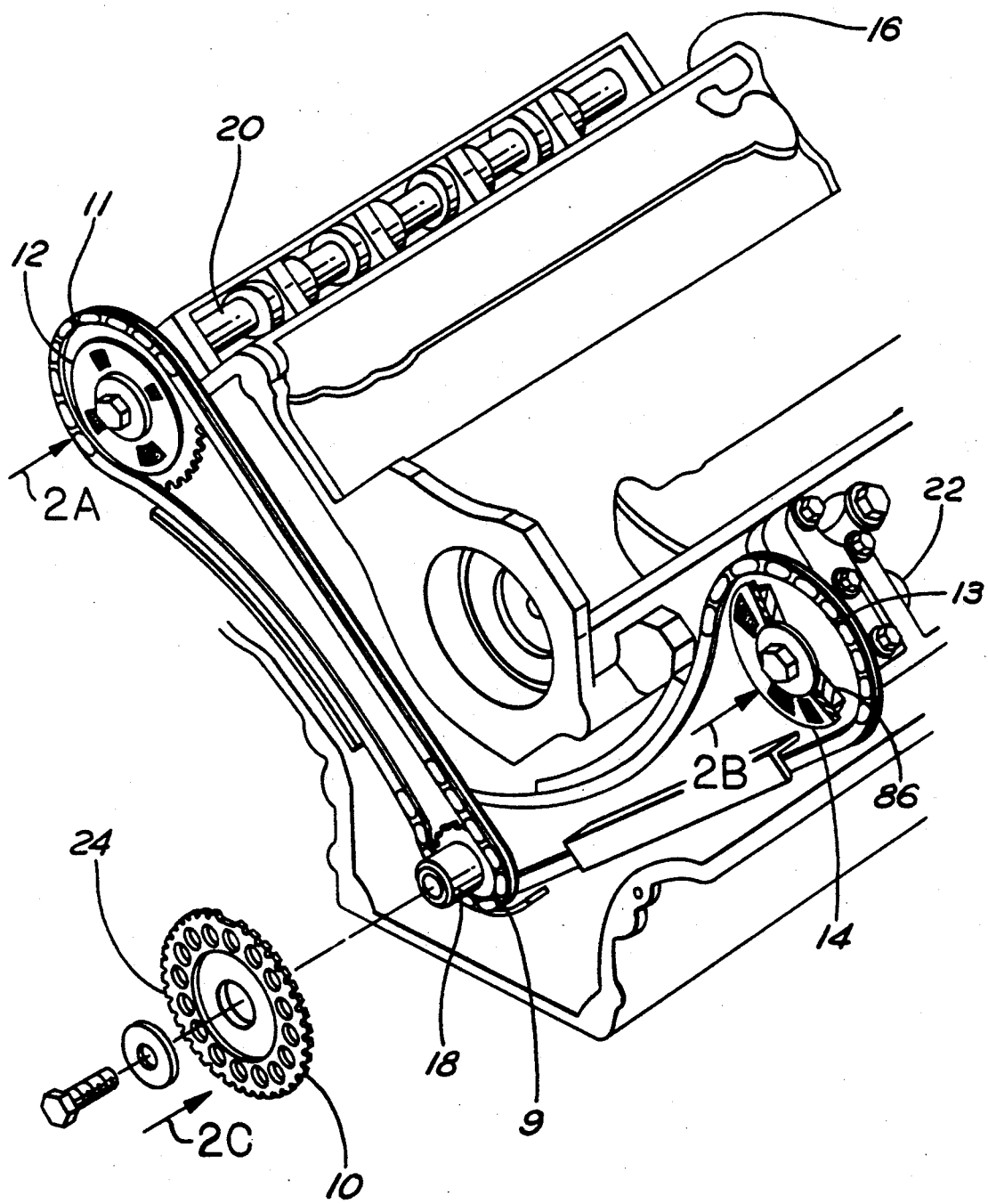
FIG. 1 is a perspective view of a V-8 engine showing two independently phase shiftable camshafts and crankshaft assembly.

FIG. 1 is a perspective of a typical V-8 internal combustion engine showing the locations of a crankshaft data wheel 10 and the right-hand cam data wheel 12 and the left-hand camshaft data wheel 14, as assembled on to the two independent camshafts 20,22. The crankshaft data wheel 10 is fixed rotationally relative to the crankshaft 18 and the crankshaft sprocket 9. The camshaft data wheels 12,14 are fixed rotationally to their respective camshafts 20,22. Also, the camshaft data wheels 12, 14 are rotationally coupled to the camshaft sprockets 11, 13 respectively. These camshaft sprockets 11, 13 rotate about the same axis as their respective camshafts 20, 22 and are in turn rotationally coupled to the crankshaft sprocket 9. Adjacent to the crankshaft data wheel 10 is a magnetic sensor 60, fixed relative to the engine 16, that generates an electrical pulse as each tooth 24 of the crankshaft data wheel 10 passes.

Figure 2C:
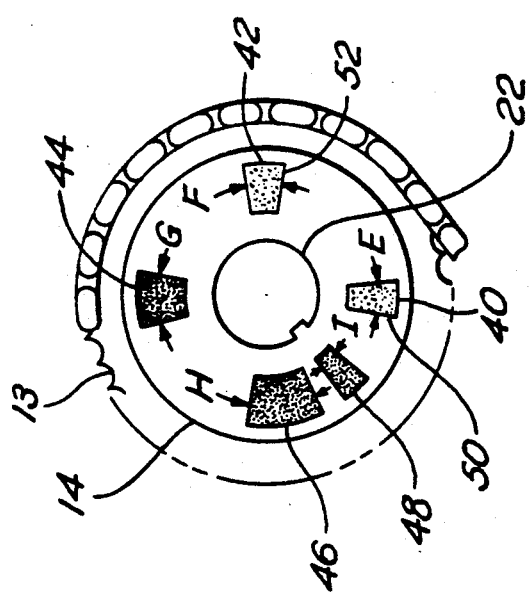
FIGS. 2A, 2B, and 2C, show, respectively, a front view of two camshaft data wheels and a crankshaft data wheel.
Figure 2B:
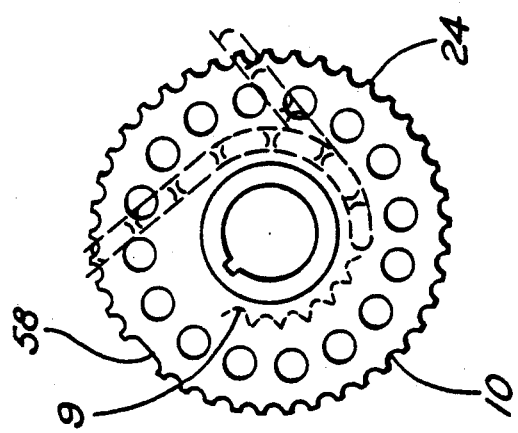
Figure 2A:
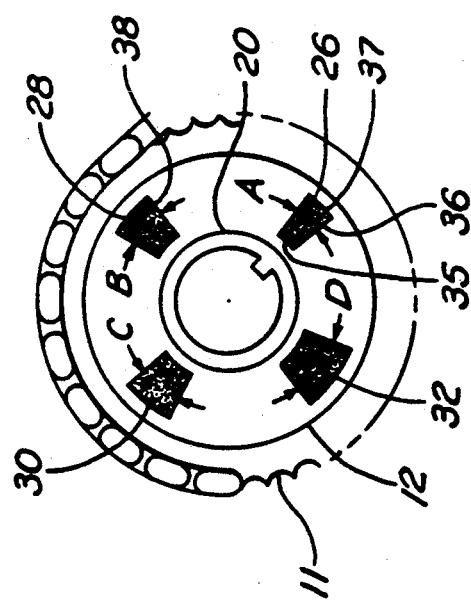

As shown in FIGS. 2-A and 3, the right-hand camshaft data wheel 12 has four camshaft position markers 26, 28, 30, 32 affixed to one of its faces, spaced radially around the periphery, one unique marker for a specific cylinder. The right-hand and left-hand designations herein are merely used as a convenient way to distinguish one camshaft from another. The cam sensor 34 is fixed relative to the engine 16. The material of these markers 26, 28, 30, 32 will be such that a sensor 34, such as a hall sensor, will be able to detect the leading and trailing edges as they pass. The right-hand camshaft data wheel 12 will rotate clockwise as shown in this figure. The radial length of the marker 26 can vary significantly, so long as the radial length is sufficient for the sensor 34 to read the marker 26 as it passes.

The leading edge of each consecutive marker 26, 28, 30, 32 is 90° ahead of the next one. For example, the leading edge 36 of marker 26 is 90° ahead of the leading edge 38 of marker 28, and so on. Each marker 26, 28, 30, 32 has a unique angular width, to permit the sensor to accurately distinguish the rotational position of the right-hand camshaft data wheel 12. In this embodiment, marker 26 is 15° wide A; marker 28 is 20° wide B; marker 30 is 25° wide C; and marker 32 is 30° wide D. The markers are positioned so that the leading edge of the signal generated by sensor 34 is advanced 10° from the rotational position of the crankshaft when its associated piston is at top dead center.

The left-hand camshaft data wheel 14 as shown in FIGS. 2-C and 3 has four camshaft position markers 40, 42, 44, 46 and one cylinder identification marker 48. Each is similar in radial length to the markers on the right-hand camshaft data wheel 12. This radial length is sufficient for the left-hand camshaft sensor 54, affixed relative to the engine block 16, to read these markers. The markers 40, 42, 44, 46, 48 are spaced radially around the periphery and rotate clockwise as shown in this figure with four markers for cylinders, and one for cylinder identification. The leading edge of each of the camshaft position markers 40, 42, 44, 46 are 90° ahead of the next one, respectively. For example, the leading edge 50 of marker 40 is 90° ahead of the leading edge 52 of marker 42. The leading edge of the cylinder identification marker 48 is half-way, i.e. 45°, between the leading edge of the camshaft position marker 40 and the camshaft position marker 46 to distinguish it from the other markers. Each of these camshaft position markers 40, 42, 44, 46 has a unique angular width. In this embodiment, marker 40 is 15° wide E; marker 42 is 20° wide F; marker 44 is 25° wide G; marker 46 is 35° wide H; and the cylinder identification marker 48 is 15° wide.

The crankshaft data wheel 10, shown in FIGS. 2-B and 3, contains at its periphery an arrangement of 35 gear teeth 24 spaced 10° apart so as to leave a 20° gap 58 between two of the teeth 24. The crankshaft sensor 60, which is fixed relative to the engine 16, senses the teeth 24, and generates a corresponding crankshaft position signal.

Figure 3:
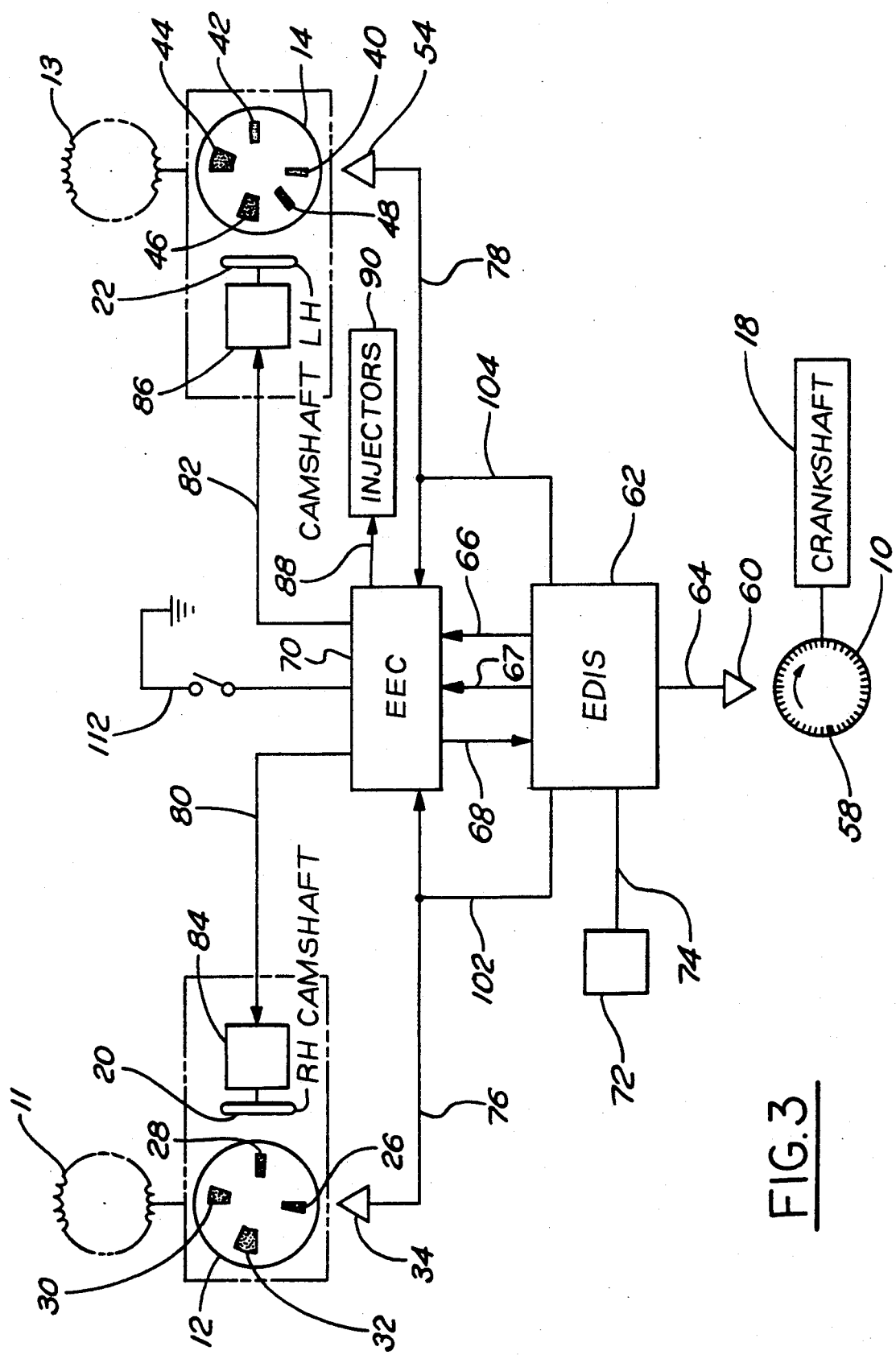
FIG. 3 is schematic block diagram of a control circuit for cam phase shifting for two independently phase shiftable camshafts and sequential fuel control.

Referring to FIG. 3, a schematic diagram of this embodiment is shown. The crankshaft sensor 60 is electrically connected 64 to the electronic distributorless ignition system (EDIS) microprocessor 62. This EDIS microprocessor 62 is electrically connected to both transmit signals on electrical lead 66 and receive signals on electrical lead 68 from the electronic engine control (EEC) microprocessor 70. In addition, the EDIS microprocessor 62 is electrically connected by lead 74 to an ignition spark mechanism 72. Both the right-hand 34 and left-hand 54 camshaft sensors are electrically connected by means of electrical leads 76, 78, respectively, to the EEC microprocessor 70. The EEC microprocessor 70 is also electrically connected via leads 80, 82 to a right-hand cam phase actuator mechanism 84 and a left-hand cam phase actuator mechanism 86, respectively. The cam phase actuator mechanisms 84, 86 are coupled between the corresponding camshafts 20, 22 and camshaft sprockets 11, 13. This can be accomplished through the use of a suitable cam phase shifting mechanism such as shown and described in U.S. Pat. No. 5,117,784 Schechter et al, which is incorporated herein by reference, preferably with an added feature of an ability to return to a predetermined default position if and when the crankshaft position signal is lost. Also, the EEC microprocessor 70 is electrically connected by electrical lead 88 to the fuel injectors 90.

Figure 4:
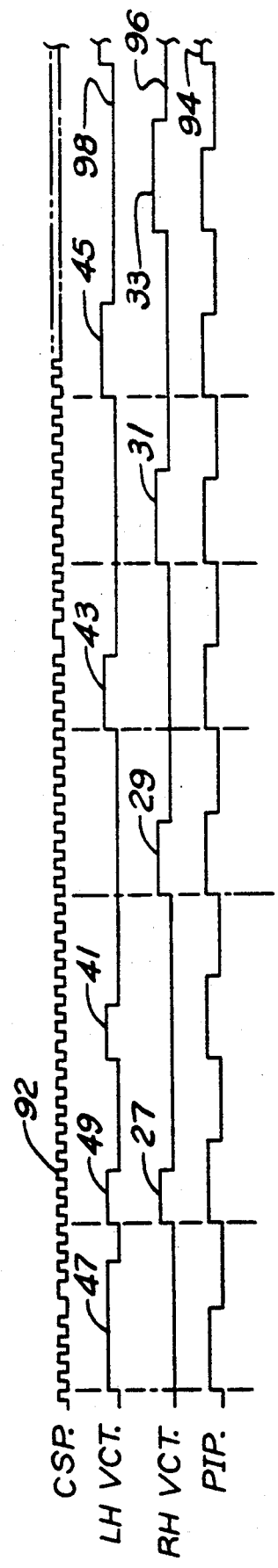
FIG. 4 is a wave form diagram for the signals generated by the crankshaft and camshaft sensors showing relative timing of the signals without phase shifting.

In operation, as the crankshaft data wheel 10 rotates, the crankshaft sensor 60 magnetically senses each crankshaft data wheel tooth 24 and produces a crankshaft signal which is electrically transmitted via lead 64 to the EDIS microprocessor 62 resulting in the signals shown in FIG. 4. The EDIS microprocessor 62 converts the signal 92 into a profile ignition pick-up (PIP) signal 94, also shown in FIG. 4, thereafter electrically transmitted via lead 66 to the EEC microprocessor 70.

Simultaneously, as the right-hand camshaft data wheel 12 rotates, the right-hand camshaft sensor 34 senses the cam data wheel markers 26, 28, 30, 32 and produces the resulting electric variable cam timing (VCT) signal 96 as shown in FIG. 4, which is electrically transmitted via lead 76 to the EEC microprocessor 70, and electrically transmitted via lead 102 to the EDIS microprocessor 62. The pulses 27, 29, 31, 33 of various widths, as shown in FIG. 4, correspond to the right-hand cam markers 26, 28, 30, 32, respectively.

Similarly, the left-hand camshaft data wheel 14 senses the cam sprocket markers 40, 42, 44, 46 and produces a resulting VCT signal 98, as shown in FIG. 4. Yet, unlike the right-hand side, the signal 98 also contains in this a component due to the cylinder identification marker 48. This overall signal 98 is then electrically transmitted via lead 78 to the EEC microprocessor 70, and electrically transmitted via lead 104 to the EDIS microprocessor 62. The pulses 41, 43, 45, 47, 49 correspond to the left-hand cam markers 40, 42, 44, 46, 48, respectively.

The VCT signals 96, 98 that are received by the EDIS microprocessor 62 are used to calculate the sequential fuel injection timing and ignition timing during start-up. This is accomplished in the EDIS microprocessor 62, by counting the number of crankshaft signal 92 pulses per VCT signal 96, 98 pulse. The variable width VCT pulses 27, 29, 31, 33 have unique widths and thus the number of crankshaft signal 92 pulses will be different for each, correlating to each individual cylinder. Therefore, the engine position and velocity can be determined quickly after the starter switch 112 is activated.

During the engine running condition, the EEC microprocessor 70 compares and synthesizes the PIP signal 94, the right-hand VCT signal 96, and the left-hand VCT and CID signal 98 to calculate the needed phase shift of either the left-hand camshaft 22, or right-hand camshaft 20, or both. If the phase shift of the right-hand camshaft 20 is necessary, then the EEC microprocessor 70 transmits an electric signal via lead 80 to the right-hand cam phase actuator mechanism 84 which physically shifts the phase of the right-hand camshaft 20. Likewise, if the phase shift is needed for the left-hand camshaft 20, the same process takes place with respect to the left-hand cam actuator mechanism 86. In addition, the EEC microprocessor 70 uses the signals 94, 96, 98 to calculate the timing necessary for sequential fuel injection and electrically transmits this via lead 88 to the sequential fuel injectors 90.

Further, the EEC microprocessor 70 transmits a signal via lead 68 to the EDIS microprocessor 62 which in turn uses that signal to calculate the ignition timing and send an ignition timing signal via lead 74 to the spark mechanism 72.

Furthermore, should the crankshaft sensor 60 fail, resulting in no signal sent to the EDIS microprocessor 62, the microprocessor 62 will in turn electrically transmit, via lead 67, a failure signal to the EEC microprocessor 70. The EEC microprocessor 62 will then use VCT signals 96, 98 to create a signal and transmit this to the EDIS microprocessor 62 which will use this via lead 68 to determine the ignition timing signal to electrically transmit via lead 74 to the ignition mechanism 72. One particular restriction to this failure mode is that the EEC microprocessor 70 will send cam phase signals via leads 80,82 to return the camshafts 20,22 to their predetermined default position and no phase shifting is possible until the crankshaft sensor 60 is again working properly.

FIG. 4 shows the pulsewaves relative to each other for various signals in the system in one complete engine cycle (for an 8 cylinder engine with 2 independently phase shiftable camshafts), with the camshaft faces in their baseline position.

The pulses 27, 29, 31, 33 of varying widths correspond to the right-hand cam markers 26, 28, 30, 32, respectively. The pulses 41, 43, 45, 47, 49 correspond to the left-hand cam markers 40, 42, 44, 46, 48, respectively.

The present invention can determine camshaft 20,22 rotational position phase relative to the crankshaft 18 whenever one of the cam pulses from the signals 96,98 correspond to the pulses of the PIP pulse 94, thus increasing the accuracy of determining camshaft 20,22 position relative to the crankshaft 18.

In a further embodiment of the invention, the only change is to use optical sensors instead of the magnetic sensors 34,54 with a corresponding change in the camshaft data wheel markers 26, 28, 30, 32, 42, 44, 46, 48 to readable optical differences between them and the camshaft data wheels 12,14, rather than a magnetic variation.

Although particular embodiments of the present invention have been illustrated in the accompanying drawings and described in the foregoing detailed description, it is to be understood that the present invention is not to be limited to just the embodiments disclosed. For example, in another alternative embodiment, the camshaft sensors 34, 54 may be oriented radially relative to the camshaft data wheels 12, 14, respectively, rather than perpendicular to the plane of rotation of the data wheels 24, 54. The variable width markers 26, 28, 30, 32, 40, 42, 44, 46, 48 would then be placed along the periphery of the data wheels 12, 14 to allow the camshaft sensors 34, 54 to read them. Numerous other rearrangements, modifications and substitutions are possible without departing from the scope of the claims hereafter.

We claim:

1. A method of operating an internal combustion engine by establishing the optimum rotational position of a crankshaft relative to a camshaft for variable cam timing, sequential fuel injection, and ignition timing comprising the steps of:

detecting the position of cylinder identification markers on a camshaft and thereby generating a camshaft signal containing positional and cylinder number identification components;

detecting the rotational position of a crankshaft relative to said camshaft and thereby generating a crankshaft signal having position and velocity components;

generating a phase angle signal in response to the positional component of said camshaft signal and said crankshaft signal, said phase angle signal corresponding to a phase angle relationship between said camshaft and said crankshaft predetermined as yielding minimum emissions and optimum fuel economy at an established operating condition;

activating a phase angle shifting mechanism with said phase angle signal to adjust the rotational position of said camshaft relative to said crankshaft; and detecting the loss of said crankshaft signal and defaulting to a predetermined cam phase signal thereby returning the camshaft to a predetermined default position, and generating an ignition timing signal in response to said cam phase signal, allowing continuous operation of the engine.

2. The method of claim 1 wherein the step of detecting the position of cylinder identification markers on a camshaft comprises:

detecting the leading edge of the marker on a camshaft data wheel rotationally fixed to the camshaft and thereby generating a position signal corresponding to a predetermined rotational position of said camshaft; and detecting the rotational width of the markers and thereby generating position identification signals, said position identification signals uniquely identifying an associated cylinder of said internal combustion engine.

3. The method of claim 1 wherein the step of detecting the rotational position of a crankshaft relative to said camshaft comprises the steps of:

detecting the passing of each tooth on the crankshaft data wheel rotationally fixed relative to said crankshaft and thereby generating positional signals indicative of position of the crankshaft; and detecting the time internal between positional signals to generate a velocity signal.

4. The method of claim 1 further comprising the step of:

detecting starting of engine to sequentially inject fuel using said cylinder identification component and said crankshaft position component.

5. A system for accurately determining the crankshaft and camshaft phase relationship and also cylinder identification in an internal combustion engine, having at least one independently phase shiftable camshaft, which comprises:

means for detecting the position of cylinder identification markers on the camshaft and thereby generating a camshaft signal containing positional and cylinder number identification components;

means for detecting the rotational position of a crankshaft relative to said camshaft, and thereby generating a crankshaft signal having position and velocity components;

means for generating a phase angle signal in response to said positional component of said camshaft signal and said crankshaft signal, said phase angle signal corresponding to a phase angle relationship between said camshaft and said crankshaft predetermined as yielding minimum emissions and optimum fuel economy at an established operating condition;

a phase angle shifting mechanism activated by said phase angle signal to adjust the rotational position of said camshaft relative to said crankshaft; and means for detecting the loss of said crankshaft signal and defaulting to a predetermined cam phase signal thereby returning the camshaft to a predetermined default position, and generating an ignition timing signal in response to said cam phase signal, allowing continuous operation of the engine.

6. The system of claim 5 wherein the means for detecting the position of cylinder identification markers on the camshaft comprises:

a camshaft data wheel fixed rotationally relative to the camshaft;

a marking disposed on a surface of said camshaft data wheel having an angular width uniquely identifying an associated piston; and a detector for detecting the leading edge and the angular width of said markings to generate said positional component and said cylinder identification component respectively.

7. The system of claim 5 wherein the means for detecting the rotational position of a crankshaft relative to said camshaft further comprises:

a crankshaft data wheel having a plurality of teeth;

a detector, fixed relative to the engine, for detecting the passing of said teeth, and thereby generating said crankshaft signal having said position and velocity components respectively.

8. The system of claim 7 wherein the crankshaft data wheel further comprises:

said data wheel having a predetermined gap between adjacent teeth to uniquely identify a predetermined rotational position of the crankshaft.

9. The system of claim 6 wherein the camshaft data wheel further comprises:

said camshaft data wheel having a marker uniquely identifying a rotational position of the camshaft.

10. A system for accurately determining the crankshaft and camshaft phase relationship and also cylinder identification in a multi-cylinder internal combustion engine with a plurality of independently phase shiftable camshafts, which comprises:

a plurality of camshaft data wheels, one each fixed rotationally relative to a corresponding one of said independently phase shiftable camshafts;

a plurality of markings disposed on a surface of each of said camshaft data wheels and each said marking having an angular width distinctive of the remaining said markings on a respective one of said camshaft data wheels and thereby identifying a respective one of said cylinders, the leading edges of said markings spaced equally around each of said camshaft data wheels;

a cylinder identification marking disposed on said surface of one of said camshaft data wheels, the leading edge of said cylinder identification marking spaced equally between two of said plurality of markings on said one camshaft data wheel;

means for detecting the position of said cylinder identification marking on said one camshaft data wheel and thereby generating a corresponding plurality of camshaft signals each containing positional and cylinder number identification components;

means for detecting the rotational position of a crankshaft relative to each of the respective plurality of said camshafts and thereby generating a crankshaft signal having position and velocity components;

means for generating a phase angle signal for each of said independently phase shiftable camshafts in response to respective said position components of said camshaft signals and said crankshaft signal, said phase angle signals corresponding to a phase angle relationship between said crankshaft and respective one of said independent camshafts predetermined as yielding minimum emission and optimum fuel economy at an established operating condition; and a plurality of phase angle shifting mechanisms, one each rotationally coupled to said independently phase shiftable camshafts, activated by a respective one of said phase angle signals to independently adjust the corresponding rotational positions of said independently phase shiftable camshafts relative to said crankshaft.

* * * * *

UNITED STATES PATENT AND TRADEMARK OFFICE
CERTIFICATE OF CORRECTION

PATENT NO. : 5,209,202
DATED : May 11, 1993
INVENTOR(S) : James B. Maurer et al

It is certified that error appears in the above-identified patent and that said Letters Patent is hereby corrected as shown below:

Column 5, line 21, after "this" insert --via lead 68--.

Column 5, lines 22-23, after "this" delete "via lead 68".

Signed and Sealed this

Twenty-fifth Day of January, 1994

Attest:

BRUCE LEHMAN

Attesting Officer     Commissioner of Patents and Trademarks